(12) United States Patent
Agrawal et al.

(10) Patent No.: US 9,165,012 B2
(45) Date of Patent: Oct. 20, 2015

(54) PERIODIC FILE SYSTEM CHECKPOINT MANAGER

(75) Inventors: Mukund Agrawal, Pune (IN); Sumit Kumar, Pune (IN); Niranjan Pendharkar, Pune (IN); Feng Wang, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 623 days.

(21) Appl. No.: 12/633,693

(22) Filed: Dec. 8, 2009

(65) Prior Publication Data

US 2011/0082835 A1 Apr. 7, 2011

Related U.S. Application Data

(60) Provisional application No. 61/248,347, filed on Oct. 2, 2009.

(51) Int. Cl.
*G06F 7/00* (2006.01)
*G06F 17/00* (2006.01)
*G06F 17/30* (2006.01)
*G06F 11/14* (2006.01)

(52) U.S. Cl.
CPC ...... *G06F 17/30194* (2013.01); *G06F 11/1407* (2013.01); *G06F 11/1446* (2013.01); *G06F 11/1464* (2013.01); *G06F 17/30073* (2013.01)

(58) Field of Classification Search
CPC ............ G06F 11/1446; G06F 11/1407; G06F 17/30073; G06F 11/1466; G06F 11/1446; G06F 11/1464; G06F 17/30194

USPC ................... 707/646, 999.001–999.005, 649
See application file for complete search history.

(56) References Cited

U.S. PATENT DOCUMENTS

| | | | | |
|---|---|---|---|---|
| 5,043,866 | A * | 8/1991 | Myre et al. | 707/999.202 |
| 6,769,074 | B2 * | 7/2004 | Vaitzblit | 707/999.201 |
| 7,331,000 | B2 * | 2/2008 | Ohno et al. | 707/999.202 |
| 7,409,495 | B1 * | 8/2008 | Kekre et al. | 707/999.202 |
| 7,644,300 | B1 * | 1/2010 | Rao | 714/5.1 |
| 7,921,328 | B1 * | 4/2011 | Gulati et al. | 714/6.23 |
| 2003/0200480 | A1 * | 10/2003 | Beattie | 714/13 |
| 2004/0210577 | A1 * | 10/2004 | Kundu et al. | 707/8 |
| 2005/0065944 | A1 * | 3/2005 | Gunther et al. | 707/100 |
| 2006/0085679 | A1 * | 4/2006 | Neary et al. | 714/13 |
| 2007/0156984 | A1 * | 7/2007 | Ebata | 711/162 |
| 2007/0220356 | A1 * | 9/2007 | Ruscio et al. | 714/42 |
| 2008/0147756 | A1 * | 6/2008 | Stager et al. | 707/204 |
| 2009/0307277 | A1 * | 12/2009 | Grubov et al. | 707/203 |
| 2010/0107158 | A1 * | 4/2010 | Chen et al. | 718/1 |

* cited by examiner

*Primary Examiner* — Kannan Shanmugasundaram
(74) *Attorney, Agent, or Firm* — Wilmer Cutler Pickering Hale and Dorr LLP

(57) ABSTRACT

A periodic checkpoint method for a file system replication source. The method comprises generating a first checkpoint at a first time on a file system replication source and identifying a set of data objects from the replication source that have been modified during a time period between the first time and a subsequent second time. A periodic checkpoint is then generated at the second time on the file system replication source by using the set of data objects.

20 Claims, 6 Drawing Sheets

PERIODIC FILE SYSTEM CHECKPOINT MANAGER

This application claims the benefit under 35 U.S.C. Section 119(e) of U.S. Provisional Application Ser. No. 61/248,347, filed on Oct. 2, 2009, to Agrawal et al., entitled "A PERIODIC FILE SYSTEM CHECKPOINT MANAGER" which is incorporated herein in its entirety.

FIELD OF THE INVENTION

The present invention is generally related to digital computer systems.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Periodic replication is one technique utilized to minimize data loss and improve the availability of data in which a replicated copy of data is distributed and stored at one or more remote sites or nodes. In the event of a site migration, failure of one or more physical disks storing data, or failure of a node or host data processing system associated with such a disk, the remote replicated data copy may be utilized. In this manner, the replicated data copy ensures data integrity and availability. Periodic replication is frequently coupled with other high-availability techniques, such as clustering, to provide an extremely robust data storage solution.

Performing a replication operation, backup operation, or the like on a large data set may take a significant amount of time to complete. The sheer size of the data set makes a replication operation take a significant amount of time. During this time, if the data set is maintained live, a problem with intervening accesses to the data set will have to be addressed. For example, on a large enterprise class system, there may be thousands of writes to that data set while it is being backed up or replicated. This factor can create data corruption hazards.

One approach to safely backing up live data is to temporarily disable write access during the backup, for example, by configuring a locking API provided by the file system to enforce exclusive read access. Such an approach might be tolerable for low-availability systems (e.g., desktop computers and small workgroup servers, where regular downtime is acceptable). Enterprise class high-availability 24/7 systems, however, cannot bear service stoppages.

A snapshot, or checkpoint, operation is often used to avoid imposing downtime. To avoid downtime, a high availability system may instead perform the replication or backup on a snapshot, which is essentially a read-only copy of the data set frozen at a point in time, and allow applications to continue writing to their data. Thus the term snapshot is used to refer to a copy of a set of files and directories as they were at a particular point in the past.

When a file-system checkpoint is taken, updates to the file-system will have copy-on-write (COW) overheads, which are very costly. COW overhead results from applications being allowed to continue writing to their data, as described above. These overheads may be acceptable in many cases because the file-system checkpoints may be short-lived. Such checkpoints may be deleted after some time, in which case file system performance suffers only for a short acceptable duration. If the checkpoints are long-lived, only the first write for a region will incur COW overheads. However, there are many applications and uses which require creating a new checkpoint every 15-30 minutes. In such a scenario, the production file-system is operating under checkpoint for virtually all its life, but at the same time, it is operating under a new checkpoint after every 30 minutes. Thus, if a region gets updated, for example, every 30 minutes, the update will incur a new COW overhead each time. For these reasons, many conventional file systems are significantly impacted when performing frequent replications.

SUMMARY OF THE INVENTION

Embodiments of the present invention provide a periodic checkpoint method and system that overcomes the significant COW (copy on write) overhead penalties incurred by conventional checkpoint mechanisms.

In one embodiment, the present invention is implemented as a periodic checkpoint method for a file system replication source. The method comprises generating a first checkpoint at a first time on a file system replication source and identifying a set of data objects from the replication source that have been modified during a time period between the first time and a subsequent second time. A periodic checkpoint is then generated at the second time on the file system replication source by using the set of data objects.

In one embodiment, the periodic checkpoint is free of data objects outside of the set of data objects. Accordingly, the probability of an update incurring COW (copy on write) overhead in response to the periodic checkpoint can be at least 10 times smaller than a probability of an update incurring COW (copy on write) overhead in response to a checkpoint preserving a point in time image of the file system in substantially its entirety (e.g., a conventional checkpoint).

In one embodiment, the set of data objects can be generated by examining whether a modification time of files of the file system falls between the first time and the second time. Additionally, the periodic checkpoint can be isolated from user interface modification.

In one embodiment, the periodic checkpoint taken at the second time is directed at preserving the files that were modified after the first checkpoint. A modification field data structure can be maintained to track a plurality of modification times of files of the file system. The modification field data structure can be maintained such that it is user inaccessible. Additionally, in one embodiment, the modification field data structure is updated in accordance with a modification to one or more files of the file system.

In one embodiment the present invention is implemented as a computer readable medium having stored thereon, computer executable instructions that, if executed by a computer system cause the computer system to perform a method for periodic checkpoint generation. The method includes generating a first checkpoint at a first time on a file system replication source and identifying a set of data objects from the replication source that have been modified during a time period between the first time and a subsequent second time. The method further includes generating a periodic checkpoint at the second time on the file system replication source by using the set of data objects, wherein the set of data objects is generated based on a modification time of files of the file system occurring between the first time and the second time.

And in another embodiment, the present invention is implemented it as a periodic file replication system, comprising means for generating a first checkpoint at a first time on a file system replication source, means for identifying a set of data objects from the replication source that have been modified during a time period between the first time and a subsequent second time, and means for generating a periodic checkpoint at the second time on the file system replication source by using the set of data objects.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
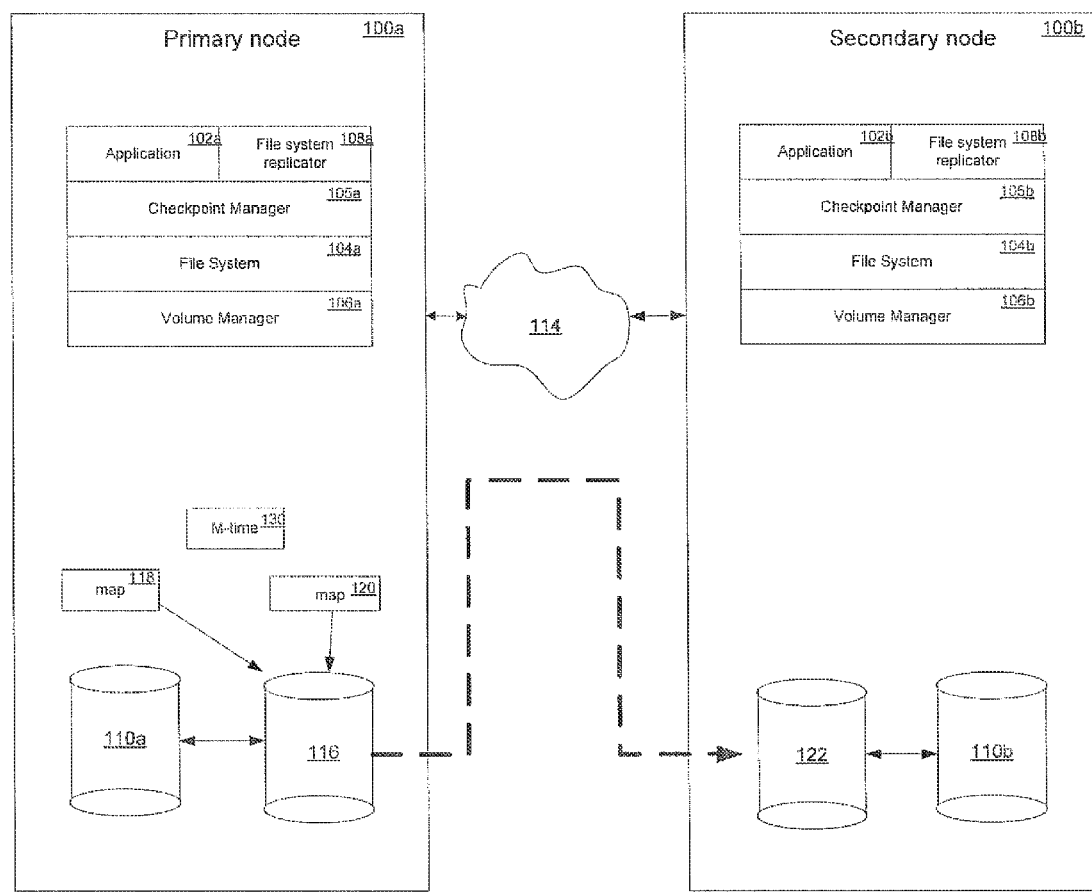
FIG. 1 illustrates a periodic replication operation within a replication system environment according to one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention provide a periodic checkpoint method and system that overcomes the significant COW (copy on write) overhead penalties incurred by conventional checkpoint mechanisms. In one embodiment, the present invention is implemented as a periodic checkpoint method for a file system replication source. The method comprises generating a first checkpoint at a first time on a file system replication source and identifying a set of data objects from the replication source that have been modified during a time period between the first time and a subsequent second time. A periodic checkpoint is then generated at the second time on the file system replication source by using the set of data objects.

It should be noted that, in one embodiment, the periodic checkpoint is free of data objects outside of the set of data objects. For example, the periodic checkpoint includes those data objects from the replication source that have been modified during the time between the first and second times and does not include the other data objects. This makes the size of the periodic checkpoint much smaller than the size of a conventional checkpoint. Accordingly, the probability of an update incurring COW (copy on write) overhead (e.g., during a replication) in response to the periodic checkpoint can be at least 10 times smaller than a probability of an update incurring COW (copy on write) overhead in response to a checkpoint preserving a point in time image of the file system in substantially its entirety (e.g., a conventional checkpoint). A periodic replication system as implemented between a primary node and a secondary node is now generally described in FIG. 1 below.

FIG. 1 illustrates a periodic replication operation within an exemplary replication system environment according to one embodiment of the present invention. In the illustrated embodiment, copies of incrementally modified or changed data of a primary file system (FS) within primary node 100a are transferred to a replicated secondary file system (R_FS) within a secondary node 100b periodically. To maintain the accessibility of the primary file system, a point-in-time "snapshot" file system (S_FS) is created and the periodic replication is performed using the snapshot file system. Similarly, to maintain the accessibility of the secondary file system, a point-in-time "snapshot" file system (RS_FS) is created and used at the secondary node 100b to receive incremental changes from the primary node 100a and to restore the replicated secondary file system.

In the replication system of the illustrated embodiment, a primary node 100a is coupled to a secondary node 100b via a network 114 (e.g., an IP network, LAN, WAN, or other communication link). Primary node 100a and secondary node 100b of the illustrated embodiment each respectively includes an application 102, a file system 104, a checkpoint manager 105, a volume manager 106 and a file system replicator 108 as shown. In one embodiment, the functionality for managing the creation of checkpoints is implemented by the checkpoint manager 105.

The FIG. 1 embodiment is initialized via the use of an initial synchronization. During the initial synchronization, the contents of a primary file system (FS) within primary node 100a are transferred to a replicated secondary file system (R_FS) within the secondary node 100b. To maintain the accessibility of the primary file system, a point-in-time "snapshot" file system (S_FS) is created and the initial synchronization (as well as subsequent periodic replication) is performed using the snapshot file system. As the initial synchronization is being performed, updates (e.g., write operations or other changes) to the primary file system are tracked for later use in performing periodic replication according to an embodiment of the present invention.

Primary node 100a further includes a primary file system 110a, a point-in-time copy 116 of primary file system 110a, a first data map 118 (current), and a second data map 120 (next). It should be readily appreciated that the labels (e.g., "current" and "next") are to some degree arbitrary and that the presence of labels as well as the particular labels depicted in the illustrated embodiment are not intended to limit the scope of the present invention.

Following initial synchronization, periodic replication is performed by first substantially simultaneously or atomically refreshing the point-in-time copy 116 of said primary file system 110a and creating a storage object including the refreshed point-in-time copy 116 and the second data map 120 (next). Thereafter, the first data map 118 (current) indicates or identifies regions within primary data volume 110a which were modified during initial synchronization (and subsequent to the creation of the storage object including the first data map 118) while the second data map 120 (next) of the newly created storage object snap point will be utilized to track or identify regions within primary file system 110a which will be modified following the start and duration of this incremental replication session. Consequently, data associated with incremental changes (e.g., data of primary filesystem 110a which was modified during initial synchronization) may be copied from point-in-time copy 116 using the first data map 118 (current) to a point-in-time copy 122 or "snapshot" file system on secondary node 100b and used to restore secondary data filesystem 110b.

It should be noted that the above described copies have impacts on the machine's overhead. These copies cause the primary node to experience COW overhead. Accordingly, an objective of embodiments of the present invention is to greatly reduce the impact of this COW overhead when the replication system is undergoing frequent periodic checkpoints (e.g., every 15 to 30 minutes, or even more often).

To achieve this objective, embodiments of the present invention advantageously utilize aspects of the following observation. Assume an example where a checkpoint c1 is taken at time t1 (e.g., a first-time) on a file system replication source, and data is successfully transferred for this checkpoint c1. Now, assume another checkpoint c2 is taken at time t2 (e.g., a subsequent second time), where the difference between t2 and t1 is the period of replication. With a conventional checkpoint mechanism, the checkpoint at t2 will preserve a consistent image of all objects in the file-system. But, since data at t1 has already been transferred, all that that is going to be read from c2 is just the data objects that got modified between t1 and t2. Because of this, a periodic checkpoint taken at t2 should advantageously just preserve the data objects that were modified after the previous checkpoint in its periodic cycle. This can be achieved by examining whether the modification time of a file falls between t1 and t2. Given that with a typical conventional system, the metadata describing the modification time of a file can be changed by applications, embodiments of the present invention maintain a separate field by using a modification time data structure 130, which will get updated when a file gets updated just like modification time metadata. Additionally, at the same time, the modification time data structure 130 is maintained such that is inaccessible to a user or application. Hence, it cannot be modified by any user interface. This attribute improves the reliability and robustness of the periodic checkpoint process.

Assume another example where a million files exist in the file-system of the primary node. For comparison's sake, in a conventional checkpoint system, a conventional checkpoint will preserve the point-in-time image of any of the million files that get updated. But a periodic checkpoint in accordance with embodiments of the present invention will only try to preserve the point-in-time image of a few tens, or in a worst case hundreds, of files that were updated in the last period. Thus, the probability of an update incurring COW overhead is at least 100 times smaller than what would be the case with a conventional checkpoint. In some instances, the probability of an update incurring COW overhead can be 1000 times smaller than a conventional checkpoint, depending upon the overall size of the file system.

It should be noted that the periodic checkpoints as described herein are not true consistent point-in-time images of the entire file-system. Hence, in one embodiment, these checkpoints are not exposed to the end-user and they typically serve no other purpose than periodic replication.

It should further be noted that periodic checkpoints as described herein are based on the fact that the previous checkpoint in this cycle has been successfully consumed. If at any point there are any failures in consuming it, the replication target secondary data volume 110b will tell the source that it somehow lost data for c1 and therefore needs that data again, which would have been easily possible with conventional checkpoints. With periodic checkpoints in one embodiment, first a check is made to determine whether the previous periodic checkpoint still exists. If yes, that previous periodic checkpoint can be used. If no, the replication system can immediately take a normal conventional checkpoint, and this new conventional checkpoint will act as the first element of the periodic checkpoint cycle.

Figure 2:
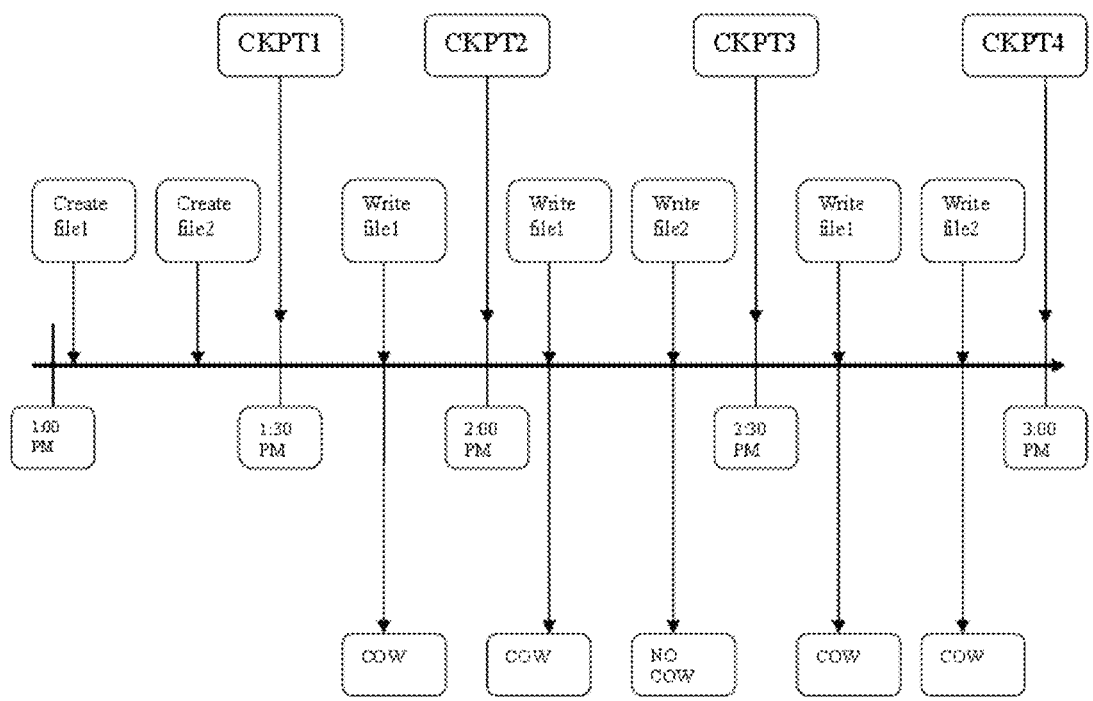
FIG. 2 shows a diagram depicting an exemplary periodic checkpoint process in accordance with one embodiment of the present invention.

FIG. 2 shows a diagram depicting an exemplary periodic checkpoint process 200 in accordance with one embodiment of the present invention. As depicted in FIG. 2, process 200 is illustrated as proceeding from left to right along a horizontal timeline starting at 1 p.m. and ending at 3 p.m.

As illustrated by FIG. 2, process 200 undergoes the creation of two new files in the file system, file1 and shortly thereafter file2. At 1:30 p.m., checkpoint CKPT1 is generated. During the intervening period between CKPT1 and CKPT2, file1 is modified by a write, as shown. For the reasons described above, this right will incur COW overhead. At 2 p.m., CKPT2 is generated. During the time period between CKPT2 and the next checkpoint, CKPT3, fuel and file2 are both modified by writes. However, there is no COW overhead for this write to file2 because file2 was not modified in the just previous replication session. But it should be noted that the writes to file1 and file2 both incur COW overhead from 2:30 p.m. to 3 p.m. session because both file1 and file2 were modified in the just previous replication session.

Figure 3:
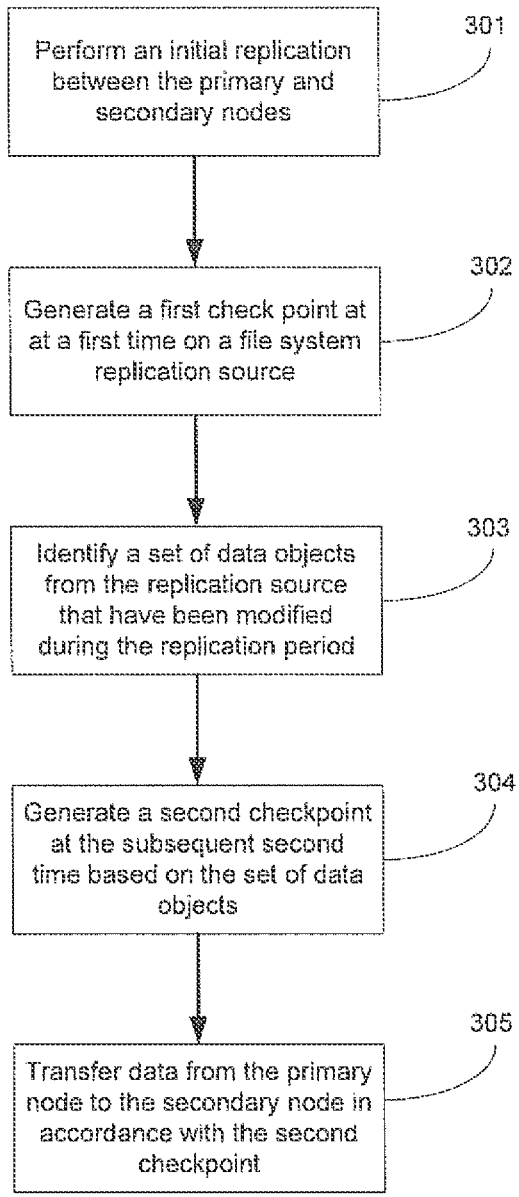
FIG. 3 shows a first flowchart of the steps of a process in accordance with one embodiment of the present invention.

FIG. 3 shows a flowchart of the steps of a process 300 in accordance with one embodiment of the present invention. As depicted in FIG. 3, process 300 shows the operating steps of the exemplary periodic replication system 100 in accordance with one embodiment of the present invention.

Process 300 begins in step 301, where an initial replication between the primary node and the secondary node is performed. For example, during the initial synchronization, the contents of a primary file system (FS) within primary node 100a are transferred to a replicated secondary file system (R_FS) within the secondary node 100b. In step 302, a first checkpoint is generated at a first time on the file system of the replication source (e.g., the primary data volume). In step 303, a set of data objects from the replication source that have been modified during the replication period are identified. As described above, this set describes the data objects that were modified after the previous checkpoint in the periodic cycle.

In step 304, a second checkpoint is generated at the subsequent second time based on the set of data objects. As described above, the second checkpoint is the next checkpoint in the periodic cycle. The data of the second checkpoint is based on those files that have been changed since the first checkpoint. In step 305, data is transferred from the primary node to the secondary node to implement the replication in accordance with the second checkpoint. For the rationale described above, the second checkpoint causes the primary node to experience a greatly reduced COW overhead in comparison to a conventional checkpoint.

Figure 4:
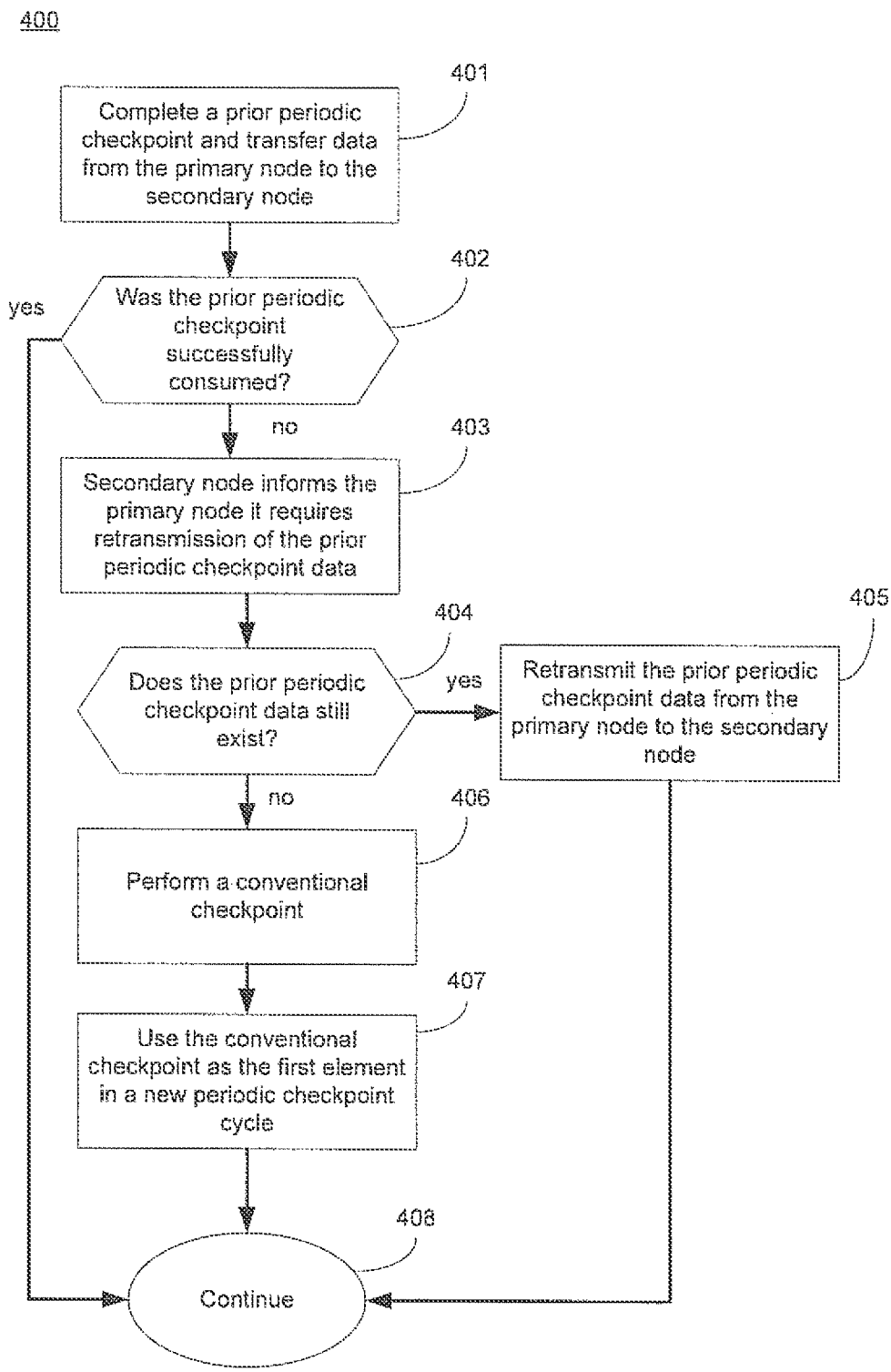
FIG. 4 shows a second flow chart of the steps of a process in accordance with one embodiment of the present invention.

FIG. 4 shows a flow chart of the steps of a process 400 in accordance with one embodiment of the present invention. As depicted in FIG. 4, process 400 shows the operating steps of a checkpoint retransmission process as implemented by the exemplary periodic replication system 100 in accordance with one embodiment of the present invention. As described above, a prior periodic checkpoint and the data associated there with can be retransmitted from the primary node to the secondary node on an occasion where the prior periodic checkpoint was not successfully consumed.

Process 400 begins in step 401, where a prior periodic checkpoint is completed and the associated data is transferred from the primary node to the secondary node. As described above, the periodic checkpoint process in accordance with embodiments of the present invention is based on the fact that the previous checkpoint in the cycle has been successfully consumed. For example, if at any point there are any failures in consuming it, the replication target secondary data volume 110b will tell the source that it somehow lost data for c1 and therefore needs that data again.

Accordingly, in step 402, the secondary node performs a check to determine whether the prior periodic checkpoint was successfully consumed. If the consumption was successful, process 400 proceeds to step 408 and continues to the next periodic scheduled checkpoint. Otherwise, process 400 proceeds to step 403, where the secondary node informs the primary node it requires retransmission of the prior periodic checkpoint data. In step 404, in response, the primary node determines whether the prior periodic checkpoint data still exists (e.g., has not been overwritten). In step 405, if the prior periodic checkpoint data still exists, it is retransmitted from the primary node to the secondary node. In step 406, if the prior periodic checkpoint data no longer exists, the replication system can immediately perform a normal conventional checkpoint, and, in step 407, this new conventional checkpoint will act as the first element of the periodic checkpoint cycle.

Figure 5:
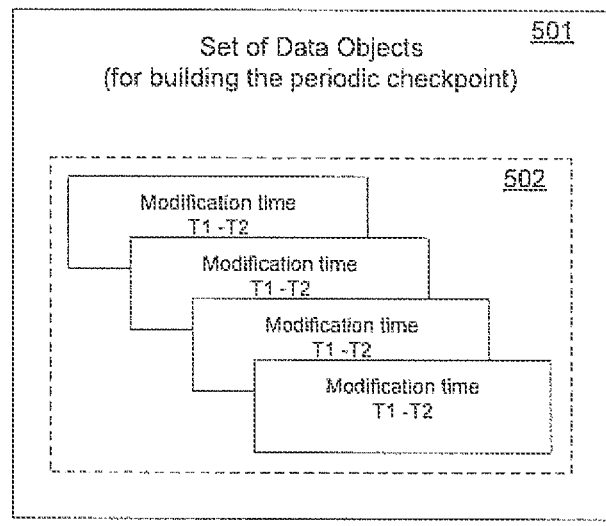
FIG. 5 shows a diagram of a set of data objects as used for building a periodic checkpoint in accordance with one embodiment of the present invention.

FIG. 5 shows a diagram of a set of data objects 501 as used for building a periodic checkpoint in accordance with one embodiment of the present invention. As described above, in an example where a checkpoint c1 is taken at time t1 (e.g., a first-time) on a file system replication source, and data is successfully transferred for this checkpoint c1, and another checkpoint c2 is taken at time t2 (e.g., a subsequent second time), the difference between t2 and t1 is the period of replication. Since data at t1 has already been transferred, all that that is going to be read from c2 are those data objects that got modified between t1 and t2. Because of this, a periodic checkpoint taken at t2 should advantageously just preserve the data objects that were modified after the previous checkpoint in its periodic cycle. This is portrayed in FIG. 5 as the data objects 502. As described above, the set of data objects 501 is built by examining whether the modification time of a file falls between t1 and t2.

Figure 6:
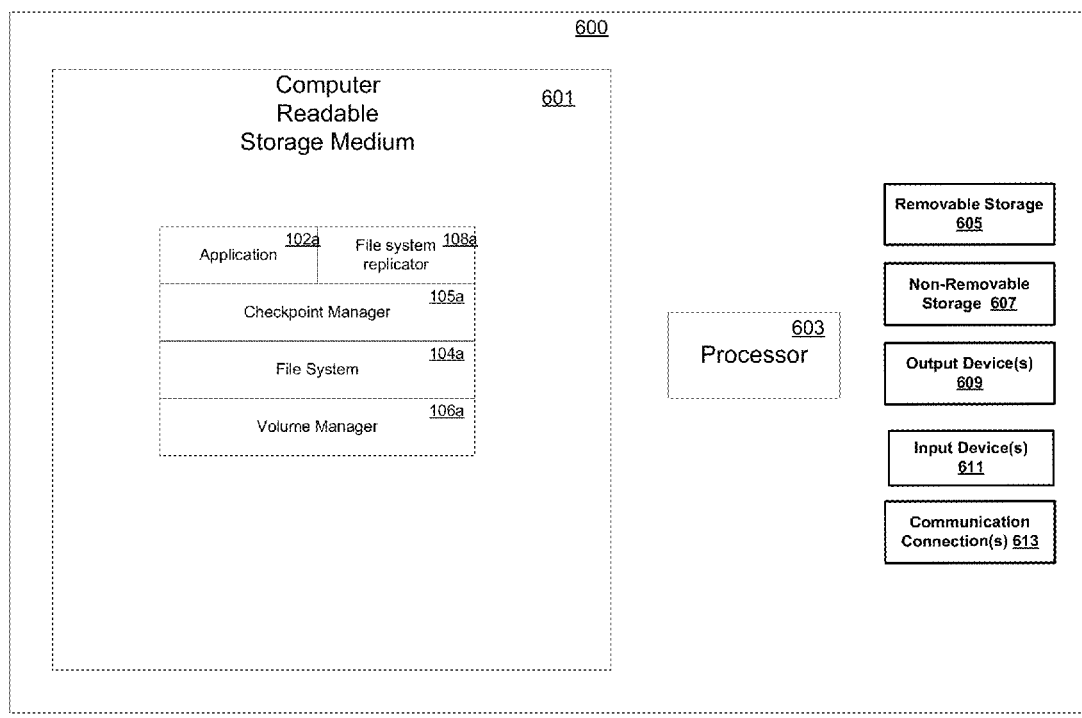
FIG. 6 shows an exemplary computer system according to one embodiment of the present invention.

FIG. 6 shows an exemplary computer system 600 according to one embodiment. Computer system 600 depicts the components of a basic computer system providing the execution environment for certain hardware-based and software-based functionality for the above described embodiments. For example, computer system 600 can be a system upon which the one or more software stacks (e.g., modules 102-108) from FIG. 1 are instantiated. Computer system 600 can be implemented as, for example, a server computer system, workstation computer system, desktop computer system, or laptop computer system. Similarly, computer system 600 can be implemented as a handheld device. Computer system 600 typically includes at least some form of computer readable media (e.g., computer readable storage medium 601). Computer readable media can be a number of different types of available media that can be accessed by computer system 600 and can include, but is not limited to, computer storage media.

In its most basic configuration, computer system 600 typically includes processing unit 603 and memory 601. Depending on the exact configuration and type of computer system 600 that is used, memory 601 can be volatile (e.g., such as DRAM, etc.) 601a, non-volatile 601b (e.g., such as ROM, flash memory, etc.) or some combination of the two. Similarly, the memory 601 can comprise other devices besides solid-state devices, such as, for example, magnetic disk-based media, optical media, or the like.

Additionally, computer system 600 can include other mass storage systems (e.g., removable 605 and/or non-removable 607) such as magnetic or optical disks or tape. Similarly, computer system 600 can include input devices 609 and/or output devices 611 (e.g., such as a display). Computer system 600 can further include network connections 613 to other devices, computers, networks, servers, etc. using either wired or wireless media. As all of these devices are well known in the art, they need not be discussed in detail.

It should further be noted, that the computer system 600 can have some, most, or all of its functionality supplanted by a distributed computer system having a large number of dispersed computing nodes, such as would be the case where the functionality of the computer system 600 is partly or wholly executed using a cloud computing environment.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A periodic checkpoint method for a file system, comprising:
    generating a first checkpoint at a first time on a file system replication source to maintain accessibility of the file system on the file system replication source, wherein the first checkpoint is a point-in-time snapshot of the file system;
    performing an initial data replication of the file system from the file system replication source to a file system replication destination by transmitting first data from the first checkpoint to the file system replication destination;
    identifying a set of data objects of the file system from the replication source that have been modified during a time period between the first time and a subsequent second time based on modification metadata for the set of data objects, wherein the modification metadata is maintained after a subsequent modification to the set of data objects;
    generating a periodic checkpoint at the second time on the file system replication source by using the set of data objects, wherein the set of data objects is generated based on a modification time of files of the file system occurring between the first time and the second time;
    transferring the modified data from the file system replication source to the file system replication destination in accordance with a second checkpoint;
    determining whether the modified data has been successfully transmitted from the file system replication source to the file system replication destination;
    instructing the file system replication source to retransmit at least a portion of the modified data when it is determined that the modified data has not been successfully transmitted;
    determining whether the second checkpoint is stored at the file system replication source in response to the instruction;
    retransmitting at least the portion of the modified data to the file system replication destination in accordance with the second checkpoint when it is determined that the second checkpoint is stored at the file system replication source; and
    generating a third checkpoint and transmitting second data to the file system replication source associated with the third checkpoint when it is determined that the second checkpoint is no longer stored at the file system replication source.

2. The method of claim 1, wherein the periodic checkpoint is free of data objects outside of the set of data objects.

3. The method of claim 1, wherein a probability of an update incurring COW (copy on write) overhead in response to the periodic checkpoint is smaller than a probability of an update incurring COW overhead in response to a checkpoint preserving a point in time image of the file system in substantially its entirety.

4. The method of claim 1, wherein the set of data objects is generated by examining whether the modification time of files of the file system falls between the first time and the second time.

5. The method of claim 1, wherein the periodic checkpoint is isolated from user interface modification.

6. The method of claim 1, wherein the periodic checkpoint taken at the second time is directed at preserving the files that have been modified after the first checkpoint.

7. The method of claim 1, wherein a modification time data structure is maintained to track a plurality of modification times of files of the file system.

8. The method of claim 7, wherein the modification time data structure is maintained user inaccessible.

9. The method of claim 8, wherein the modification time data structure is updated in accordance with a modification to one or more files of the file system.

10. A non-transitory computer readable storage medium having stored thereon, computer executable instructions that, if executed by a computer system cause the computer system to perform a periodic checkpoint method for a file system comprising:
    generating a first checkpoint at a first time on a file system replication source to maintain accessibility of the file system on the file system replication source, wherein the first checkpoint is a point-in-time snapshot of the file system;
    performing an initial data replication of the file system from the file system replication source to a file system replication destination by transmitting first data from the first checkpoint to the file system replication destination;
    identifying a set of data objects of the file system from the replication source that have been modified during a time period between the first time and a subsequent second time based on modification metadata for the set of data objects, wherein the modification metadata is maintained after a subsequent modification to the set of data objects;
    generating a periodic checkpoint at the second time on the file system replication source by using the set of data objects, wherein the set of data objects is generated based on a modification time of files of the file system occurring between the first time and the second time;
    transferring the modified data from the file system replication source to the file system replication destination in accordance with a second checkpoint;
    determining whether the modified data has been successfully transmitted from the file system replication source to the file system replication destination;
    instructing the file system replication source to retransmit at least a portion of the modified data when it is determined that the modified data has not been successfully transmitted;
    determining whether the second checkpoint is stored at the file system replication source in response to the instruction;
    retransmitting at least the portion of the modified data to the file system replication destination in accordance with the second checkpoint when it is determined that the second checkpoint is stored at the file system replication source; and generating a third checkpoint and transmitting second data to the file system replication source associated with the third checkpoint when it is determined that the second checkpoint is no longer stored at the file system replication source.

11. The computer readable media of claim 10, wherein the periodic checkpoint is isolated from user interface modification.

12. The computer readable media of claim 10, wherein the periodic checkpoint taken at the second time is directed at preserving the files that are modified after the first checkpoint.

13. The computer readable media of claim 10, wherein the periodic checkpoint is free of data objects outside of the set of data objects, and wherein a probability of an update incurring COW (copy on write) overhead in response to the periodic checkpoint is smaller than a probability of an update incurring COW overhead in response to a checkpoint preserving a point in time image of the file system in substantially its entirety.

14. The computer readable media of claim 10, wherein a modification time data structure is maintained to track a plurality of modification times of files of the file system, and wherein the modification time data structure is user inaccessible.

15. A periodic file replication system, comprising:
a computer system having a processor coupled to a computer readable storage media and executing computer readable code which causes the computer system to implement a checkpoint manager module, wherein the checkpoint manager module:
generates a first checkpoint at a first time on a file system replication source to maintain accessibility of the file system on the file system replication source, wherein the first checkpoint is a point-in-time snapshot of the file system;
performs an initial data replication of the file system from the file system replication source to a file system replication destination by transmitting first data from the first checkpoint to the file system replication destination;
identifies a set of data objects of the file system from the replication source that have been modified during a time period between the first time and a subsequent second time based on modification metadata for the set of data objects, wherein the modification metadata is maintained after a subsequent modification to the set of data objects;
generates a periodic checkpoint at the second time on the file system replication source by using the set of data objects;
transfers the modified data from the file system replication source to the file system replication destination in accordance with a second checkpoint;
determines whether the modified data has been successfully transmitted from the file system replication source to the file system replication destination;
instructs the file system replication source to retransmit at least a portion of the modified data when it is determined that the modified data has not been successfully transmitted;
determine whether the second checkpoint is stored at the file system replication source in response to the instruction;
retransmit at least the portion of the modified data to the file system replication destination in accordance with the second checkpoint when it is determined that the second checkpoint is stored at the file system replication source; and
generate a third checkpoint and transmitting second data to the file system replication source associated with the third checkpoint when it is determined that the second checkpoint is no longer stored at the file system replication source.

16. The system of claim 15, wherein the periodic checkpoint is free of data objects outside of the set of data objects.

17. The system of claim 15, wherein the set of data objects is generated by examining whether a modification time of files of the file system falls between the first time and the second time.

18. The system of claim 15, wherein the periodic checkpoint taken at the second time is directed at preserving the files that have been modified after the first checkpoint.

19. The system of claim 15, wherein a modification time data structure is maintained to track a plurality of modification times of files of the file system, and wherein the modification time data structure is maintained user inaccessible.

20. The system of claim 19, wherein the modification time data structure is updated in accordance with a modification to one or more files of the file system.

* * * * *